United States Patent

[11] 3,580,266

[72] Inventor Karl A. Brandenberg
 Hayward, Calif.
[21] Appl. No. 809,214
[22] Filed Mar. 21, 1969
[45] Patented May 25, 1971
[73] Assignee The Aro Corporation
 Bryan, Ohio

[54] COMPARATOR CIRCUIT FOR DIGITAL POSITIONING CONTROL
 4 Claims, 2 Drawing Figs.

[52] U.S. Cl. .................................................... 137/81.5
[51] Int. Cl. .................................................... F15c 1/12
[50] Field of Search ....................................... 235/201
 (gen), 201 (sens), 201 (p.f.), 201 (m.e.), 200
 (anal), 200 (gen), 200 (p.f.); 137/81.5

[56] References Cited
 UNITED STATES PATENTS
3,232,533 2/1966 Boothe ........................... 235/200
3,241,668 3/1966 Schonfeld et al. .............. 235/201X
3,250,285 5/1966 Vockroth, Jr. .................. 137/81.5
3,299,255 1/1967 Bauer ............................. 235/201X
3,364,342 1/1968 Jakubowski .................... 235/201X
3,420,254 1/1969 Machmer ....................... 235/201X
3,491,946 1/1970 Muller ............................ 235/201
3,495,776 2/1970 O'Neill ........................... 137/81.5X Primary Examiner—Samuel Scott
Attorney—Malinare, Allegretti, Newitt & Witcoff ABSTRACT: A pneumatic comparator circuit comprised of a plurality of stages arranged in serial order, each stage including a pair of pneumatic OR devices in series with a pneumatic NOT device. One of the inputs to each OR is also connected with the control input of the unassociated NOT device of the stage. Depending upon whether a signal to one or the other of the respective OR devices is present, an output signal is provided to the appropriate NOT device and finally to an ultimate output.

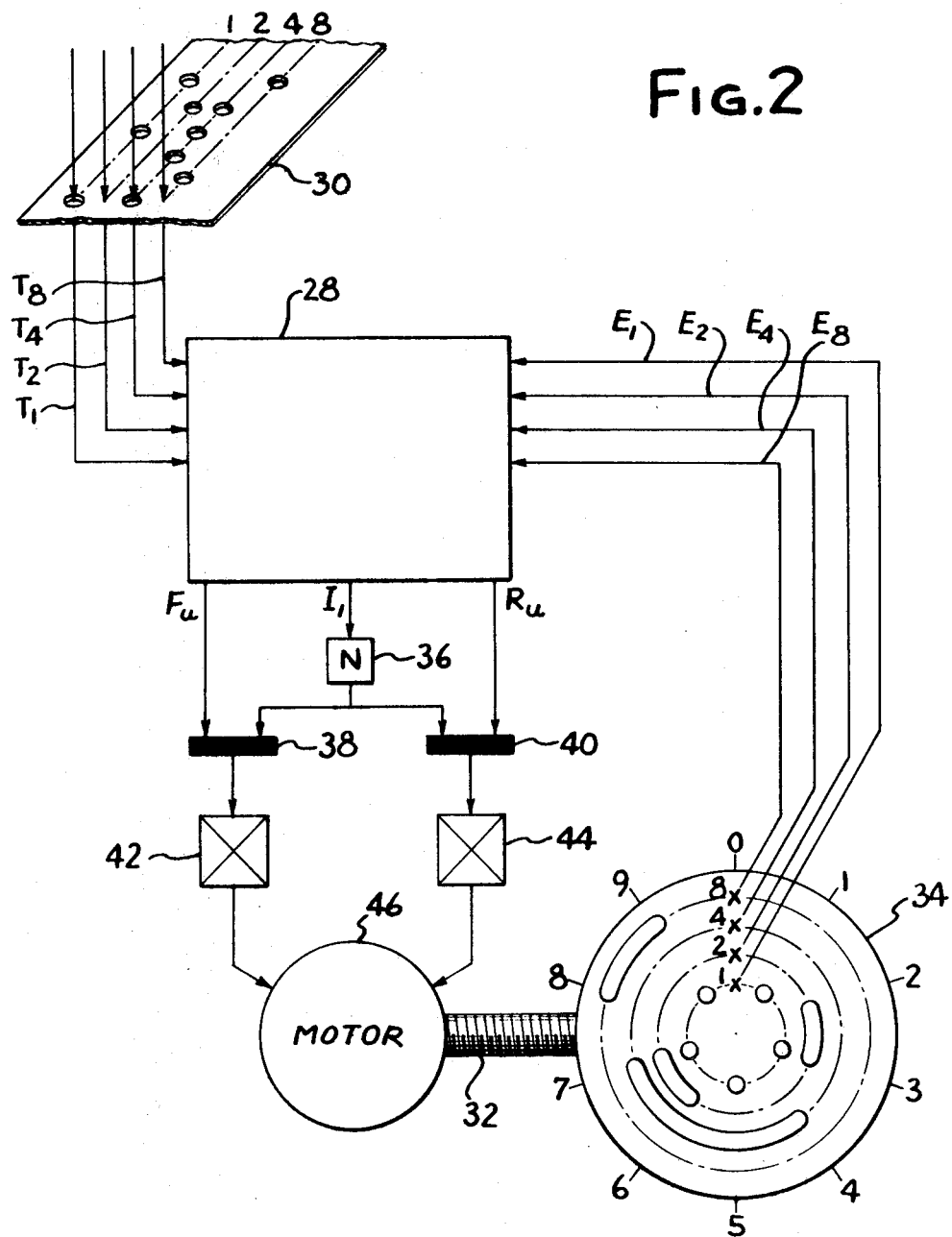

COMPARATOR CIRCUIT FOR DIGITAL POSITIONING CONTROL

BACKGROUND OF THE INVENTION

With the advent of fluidic devices it has become desirable to provide a pneumatic comparator circuit for programmed operations of mechanical equipment. The criteria of minimal logic for such a circuit must take into account the relative complexity of the logic elements available for implementation of the circuit. Classical manipulation of the basic logic functions alone does not necessarily yield the optimum solution.

It is desirable to provide a circuit which compares the digital value of a command signal source, for example, a tape reader, with that of a feedback source, for example, an encoder. The command signal and feedback inputs can be in binary code, binary coded decimal or any other analytic (weighted) code.

Providing a circuit having these characteristics and features yet at the same time having a simple and rugged construction are some of the problems solved by the presently claimed invention.

SUMMARY OF THE INVENTION

In a principal aspect the present invention comprises a fluid comparator circuit which comprises a comparator stage that includes a command OR device in series with a command NOT device and a feedback OR device in series with a feedback NOT device. The input to the command OR is also directed to the control input of the feedback NOT. The input to the feedback OR is similarly directed to the control input of the command NOT. Thus, whenever the command input signal is present and the feedback input signal is off, an output signal is provided. Stages may be arranged in serial order with any stage in a nonequivalent state generating a signal which inhibits operation of all subsequent stages.

It is thus an object of the present invention to provide an extremely simple, yet utilitarian pneumatic comparator circuit.

It is a further object of the present invention to provide a comparator circuit which is adapted to compare two signal sources and provide a uniformly logical output based on the relative values of the two input signal sources.

It is a further object of the present invention to provide a comparator circuit comprised of a number of serial stages with the operative stage also acting to inhibit all lower order stages.

Still another object of the present invention is to provide a comparator circuit adapted to operate in binary code, binary coded decimal or any other weighted code.

These and other objects, advantages and features of the present invention will be set forth in greater detail in the description which follows:

BRIEF DESCRIPTION OF THE DRAWINGS

In the detailed description which follows, reference will be made to the drawings comprised of the following figures:

FIG. 2 is a schematic diagram of a system utilizing the improved comparator circuit of the invention.

DESCRIPTION OF THE PREFERRED EMBODIMENT

Figure 1:
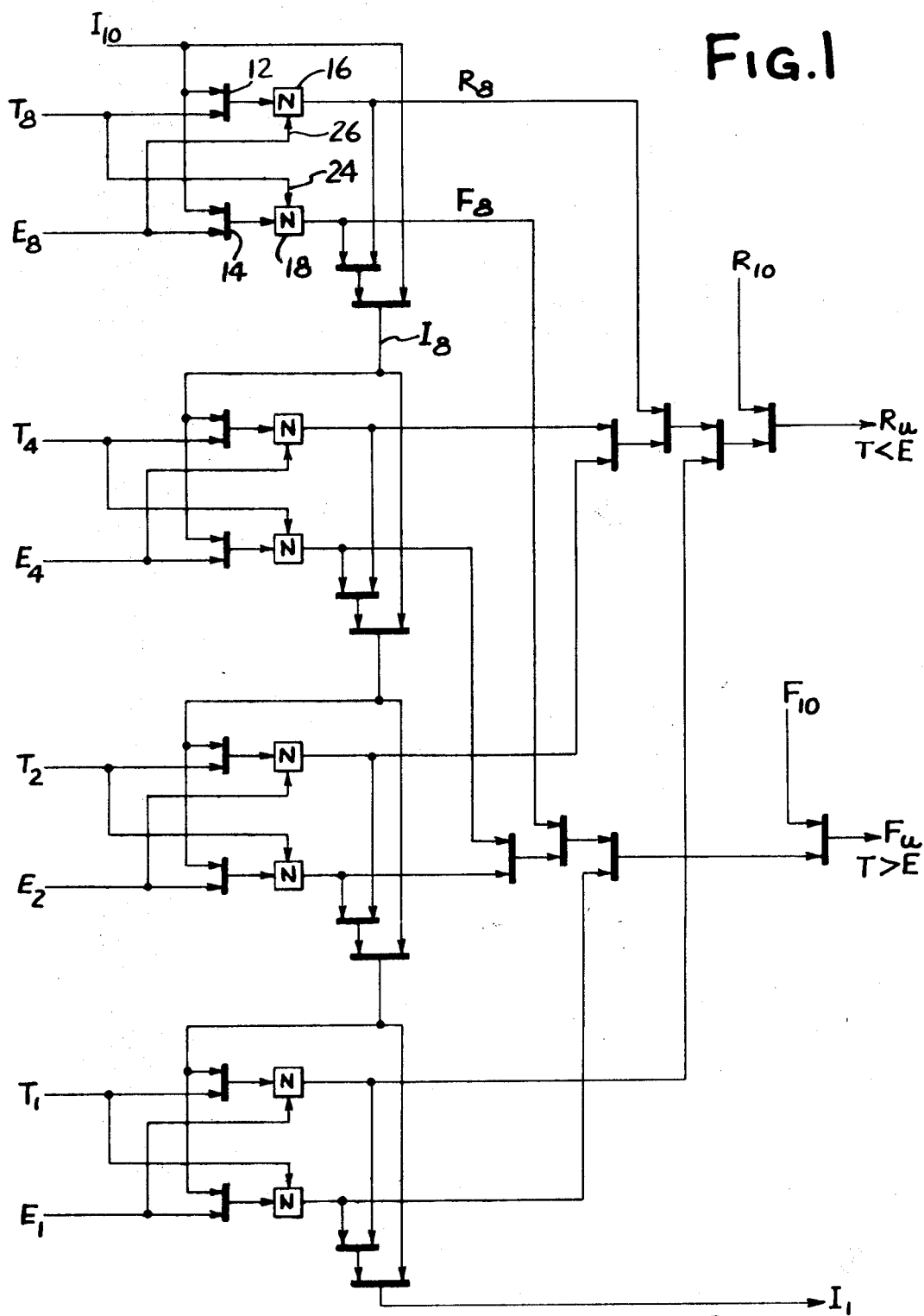
FIG. 1 is a schematic diagram of a typical comparator circuit contemplated by the claims of the invention.

As it will be noted by reference to FIG. 1 there are indicated four comparator stages of a single comparator circuit operative to provide a binary output. For convenience, the outputs of the circuit are indicated by symbols R (for reverse) and F (for forward) in the drawing. Inputs are provided to each binary stage through two input lines as, for example, command input line, $T_8$, and feedback input line $E_8$. These respective inputs, $T_8$ and $E_8$, provide a signal to OR devices 12 and 14 respectively. The output of ORs 12 and 14 are connected respectively to the input of NOT devices 16 and 18. NOT 16 is thus in series with OR 12 and NOT 18 is in series with OR 14.

The output of the NOTs 16 and 18, $R_8$ and $F_8$ respectively, are connected respectively with the ultimate command signal outputs $R_u$ and $E_u$. This connection may be direct in the case where a single stage comprises a circuit or through a series of OR devices as indicated in the drawing. The output $R_8$ and $F_8$ are also connected with the command and feedback OR inputs, $T_x$ and $E_x$ (where $x$ is less than 8), to provide an inhibitor signal, $I_8$, to all the succeeding or lower stages in the comparator circuit. All stages have their outputs $R_x$ and $F_x$ so incorporated in the circuit to provide an inhibitor $I_x$ signal to the lower stages.

The command input $T_8$ is also connected with the control input line 24 of feedback NOT 18. Likewise, the feedback input $E_8$ is connected with the control input line of the command NOT 16. The circuit is thus capable of determining whether the E (feedback) signal is greater than, equal or less than the T (command) signal. As long as the T value is less than E, a signal appears at the ultimate output $R_u$. If T is greater than E, a signal appears at the ultimate output $F_u$. The output signals can, for example, stand for forward and reverse motion of a machine table and therefore indicate and initiate the corresponding motion of the table being controlled.

If all the T and E inputs are equal, that is the state of each T corresponds to its associated E both being either off or on, then no signal will appear at the outputs $R_u$ and $F_u$. This condition is used to stop the motion of the machine. If the signals at one stage, for example, $T_8$ and $E_8$ and all higher order stages, are all off or if they are all on, then no signal is available at $R_8$ and $F_8$ because none is provided by $T_8$ or $E_8$. The inhibitor signal $I_8$ to the lower stages is then off. Thus, the next lowest stage $T_4$ and $E_4$ is free to operate and control the ultimate output $R_u$ and $F_u$.

There now will be described a typical embodiment utilizing the comparator circuit of the present invention. Referring to FIG. 2, there is shown a circuit of the type disclosed in FIG. 1 generally indicated in the schematic diagram as the circuit block 28. The circuit block 28 may be comprised of NOT elements of the type disclosed in U.S. Pat. No. 3,389,720 and OR elements of the type disclosed in U.S. Pat. No. 3,403,693 interconnected by means of a circuit mechanism of the type disclosed in U.S. Pat. Nos. 3,407,833 and 3,407,834, the descriptions of which elements and mechanisms are incorporated by reference herewith.

Provided as inputs to the circuit block 28 are the control inputs $T_1$, $T_2$, $T_4$ and $T_8$. An air supply is provided to any one or a combination of these inputs through a punched tape 30. For example, the tape 30 in the position shown in FIG. 2 insures that an air supply is provided to input $T_1$ and $T_4$ thereby providing in binary coded decimal form the digit "5" as an input to the circuit block 28. The binary tracks "1," "2," "4" and "8" are indicated on the tape 30.

Also connected with the circuit block 28 are encoder or feedback inputs $E_1$, $E_2$, $E_4$ and $E_8$. The encoder inputs are activated or provided with a pneumatic supply through an encoder disc which is mechanically driven by the tool or device being controlled. For example, if the schematic member 32 in FIG. 2 represents the lead screw of a machine table, that lead screw 32 would be operative to directly drive the encoder disc 34. An encoder disc 34 is provided for each decimal place and for purposes of illustration only one disc 34 is shown. Each disc 34, of course, corresponds to a control input tape 30 or the equivalent to provide signals to the circuit block 28. The disc 34 thus includes openings in the binary tracks "1," "2," "4" and "8" as indicated for a binary coded decimal system. In this manner feedback or encoder inputs are provided to the circuit block 28. In FIG. 2, then, the binary code signal for the digit "0" is provided.

The circuit block 28 operates to produce outputs $F_u$ and $R_u$ as described above. In addition the inhibitor output $I_1$ is provided to indicate when the control inputs $T_x$ and encoder inputs $E_x$ are equal. The inhibitor input $I_1$ is directed into a NOT device 36. The NOT device 36 has an output which splits and connects with a forward OR device 38 and a reverse OR device 40. The ORs 38 and 40 control respectively power valves 42 and 44, which, in turn, operate respectively to drive a motor 46 either in the forward or the reverse direction. Thus the lead screw 32 of the machine table is driven in the forward or the reverse direction according to the relationship between the tape 30 input and disc 34 input until equivalence is attained whereupon the inhibitor signal $I_1$ is removed from the NOT 36.

When the inhibitor signal $I_1$ from the circuit block 28 turns "off," the inputs, both control and feedback, are in equivalence and simultaneously the NOT 36 provides a signal to both OR devices 38 and 40. This, in turn, operates to provide a power signal to both sides of the pneumatic motor 46 thereby causing instantaneous stopping of the lead screw 32.

The motor 46 need not be pneumatically operated, although interface problems are substantially lessened if it is an air motor. For example, the reverse and forward control signals and inhibitor signal may be utilized to control an electric motor.

What I claim is:

1. A pneumatic comparator circuit comprising, in combination; a comparator stage, said stage including a command OR device, a feedback OR device, a command input flow pressure line as an input to said command OR device, a feedback flow pressure line as an input to said feedback OR device, a command fluidic NOT device, a feedback fluidic NOT device, each of said NOT devices having an input port, an output port and a control port, the input port of said command NOT device receiving an output signal from said command OR device, the input port of said feedback NOT device receiving an output signal from said feedback OR device, the control input of command NOT device receiving an input from said feedback flow pressure line, the control input of feedback NOT device receiving a signal from said command flow pressure line such that the output of said command NOT device is operable to provide a command control signal whenever pressure in said feedback line is greater than pressure in said command line and the output of said feedback NOT provides a feedback control signal whenever pressure in said command line is present and the pressure in said feedback line is absent.

2. The comparator circuit of claim 1 including a plurality of serially ordered stages, each stage having a command NOT output and a feedback NOT output, the command NOT output of each stage being connected to the input side of a first ultimate output OR device and the feedback NOT output of each stage being connected to a second ultimate output OR device, the output of said first ultimate OR device operative to provide a control signal whenever one of the command NOT devices of any of the stages provides an output and the output of said second ultimate OR device operative to provide a control signal whenever one of the feedback NOT devices of any of the stages provides an output, said command and feedback NOT outputs of each stage connected to provide a signal to the command OR device and feedback OR device of all succeeding stages such that only one of said stages provides an ultimate control signal output at any given time.

3. A pneumatic comparator circuit of the type set forth in claim 1 in combination with a control input system and a feedback input system, said feedback input system cooperatively connected with a driven device to indicate a parameter of said device, said comparator circuit providing control outputs to control the operation of said driven device, said pneumatic comparator circuit also including an inhibitor output operative to provide an output signal to said driven device to substantially, instantaneously stop said driven device when said pneumatic control input to said pneumatic logic circuit and said feedback control to said pneumatic logic circuit are in equivalence.

4. The comparator circuit of claim 1 including a plurality of serially ordered stages wherein each stage includes two additional OR devices, one of said additional OR devices receiving inputs from said command NOT output and also from said feedback NOT output, and the other of said additional OR devices receiving inputs from said output of said one additional OR device and also from the command NOT output and feedback NOT output of all preceding stages of said serially ordered stages, the command NOT output and feedback NOT output of each stage also being connected to an ultimate command control output and an ultimate feedback control output respectively.